3,264,052
PROCESS FOR DYEING POLYESTER FIBERS
Paul Rhyner, Basel, Switzerland, assignor to Ciba Limited, Basel, Switzerland, a Swiss company
No Drawing. Filed Dec. 7, 1962, Ser. No. 242,931
Claims priority, application Switzerland, Jan. 5, 1962, 121/62
5 Claims. (Cl. 8—26)

In the known processes for the dyeing of polyester material it is usual to carry out the process in closed circulation vats in which the material, for example, in the form of yarns on crosswound bobbins or fabrics in the form of so-called wound webs is introduced into the dyeing apparatus in a manner such that the dye liquor can circulate through the fibrous material. This method of dyeing demands a very high stability in the dyestuff dispersions used. If the stability of the dispersion is insufficient, so-called filtration effects are produced, that is to say, part of the dyestuff is held back on the surface of the fibrous material and deposited thereon so that the dyeing obtained is uneven and is not fast to rubbing. While it is possible to overcome these difficulties by certain expedients, such as previous reprecipitation of the dyestuff from sulfuric acid or after-treating the dyed fabric, these expedients considerably increase the cost of the dyed material.

The above-mentioned difficulties arise more especially in the case of azo dyestuffs of the formula (1) 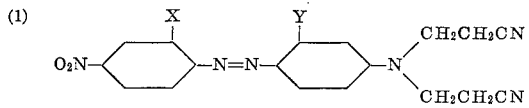

in which X represents a hydrogen, chlorine or bromine atom or a cyano group, and Y represents a hydrogen or chlorine atom or a methyl group.

The present invention is based on the observation that the afore-mentioned difficulties can be overcome in a simple manner by dyeing the polyester fibers with mixtures of dyestuffs of the Formula 1 that differ in at least one of the substituents X and Y.

Of special value are mixtures of dyestuffs of the formulae (2) 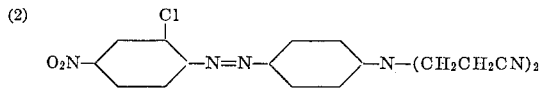

and (3) 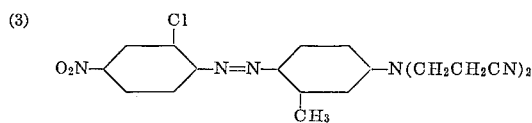

The proportions of the constituent dyestuffs of the mixture may vary within wide limits but it is of advantage to use them at a ratio such that the proportion of each constituent dyestuff is at least 5% or preferably at least 10%. Especially good results have been obtained with mixtures consisting of 65 to 75% of the dyestuff of the Formula 2 and about 35 to 25% of the dyestuff of the Formula 3.

The mixtures referred to above can be prepared by intimately mixing the constituent dyestuffs, for example by grinding, advantageously in the presence of a dispersing agent, such as sulfite cellulose waste liquor or the sodium salt of 1:1'-dinaphthylmethane-2:2'-disulfonic acid. In this manner the necessary state of fine subdivision of the dyestuff mixture is achieved at the same time. Instead of mixing the previously made constituent dyestuffs, it is possible to perform a mixed synthesis, that is to say to couple the diazo compound of a unitary amine of the formula (4) 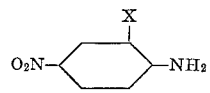

with a mixture of amines of the formula (5) 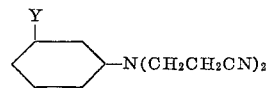

or alternatively a mixture of amines of the Formula 4 is diazotized and coupled with a unitary amine of the Formula 5, X and Y in these formulae having the above meanings.

For dyeing purposes the above-mentioned dyestuff mixtures are advantageously used in a finely dispersed form, the dyeing operation being performed in the presence of a dispersant, such as sulfite cellulose waste liquor or a synthetic detergent, or of a combination of different wetting agents and dispersants. As a rule, it is of advantage to convert the dyestuffs to be used, before dyeing, into a dyeing preparation containing a dispersant and the finely dispersed dyestuffs in a form such that a fine dispersion is obtained on diluting the dyestuff preparation with water. Such dyestuff preparations may be made in known manner, for example by reprecipitating the dyestuff from sulfuric acid and grinding the resulting suspension with sulfite cellulose waste liquor, or if desired by grinding the dyestuffs in a highly efficient mill in the dry or wet form, with or without adding a dispersant during the grinding operation.

To produce dyeings of superior tinctorial strength on polyethylene terephthalate fibers it has been found advantageous to add a swelling agent to the dyebath, or more especially to perform the dyeing operation under superatmospheric pressure at a temperature above 100° C., for example at 120° C. Suitable swelling agents are aromatic carboxylic acids, for example benzoic or salicylic acid; phenols, for example, ortho-hydroxydiphenyl or para-hydroxydiphenyl; aromatic halogen compounds such, for example, as chlorobenzene, ortho-dichlorobenzene or trichlorobenzene; phenylmethyl carbinol or diphenyl. When dyeing under superatmospheric pressure it has been found advantageous to maintain a weakly acid reaction in the dyebath, for example by adding a weak acid, for example acetic acid.

The dyestuff mixtures to be used in the present process are also suitable for dyeing by the so-called thermofixation method, according to which the fabric to be dyed is impregnated with an aqueous dispersion of the dyestuff mixture, which contains with advantage 1 to 50% of urea and a thickener, particularly sodium alginate, preferably at a temperature not exceeding 60° C., whereupon the impregnated fabric is squeezed in the conventional manner, advantageously to a weight increase of 50 to 100%.

To fix the dyestuffs on the fabric so impregnated, the latter is advantageously first dried—for example in a current of warm air—and then heated at a temperature over 100° C., for example between 180 and 220° C.

By virtue of their good resistance to wool, the dyestuffs to be used in the present process are also suitable for dyeing mixtures of polyester fibers with wool.

The present process provides strong, full dyeings and prints having excellent properties of wet fastness and above all outstanding fastness to light and sublimation.

A further advantage of the mixtures to be used in the present process is that their build-up is much better than that of the constituent dyestuffs as such.

Unless otherwise indicated, parts and percentages in the following examples are by weight.

*Example 1*

An aqueous paste containing 70 parts of the dyestuff of the formula

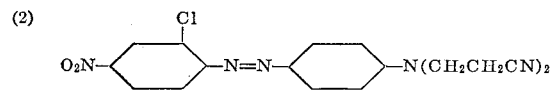

and 30 parts of the dyestuff of the formula

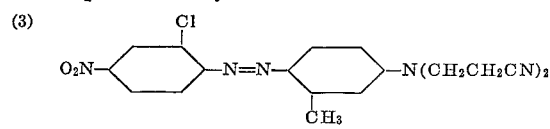

was ground with an equal weight of dried sulfite cellulose waste liquor until a smooth paste containing about 10% of the dyestuffs had formed.

100 parts of polyethylene terephthalate fiber material were first cleaned for ½ hour in a bath containing 1 to 2 parts of the sodium salt of N-benzyl-μ-heptadecyl-benzimidazole disulfonic acid and 1 part of concentrated aqueous ammonia solution per 1000 parts of water. The material was then immersed in a dyebath consisting of 10 parts of the dyestuff paste prepared as described in the first paragraph of this example dispersed in 3000 parts of water which contains 3 parts of 40% acetic acid and 4 parts of the sodium salt of N-benzyl-μ-heptadecyl-benzimidazole disulfonic acid. The whole was heated in an autoclave to 130° C. and kept at that temperature for about ½ hour; the fabric was then thoroughly rinsed and, if necessary, washed for ½ hour at 60 to 80° C. in a solution containing 1 part of the sodium salt of N-benzyl-μ-heptadecylbenzimidazole disulfonic acid per 1000 parts of water. The resulting strong, orange-red dyeing displayed excellent fastness to sublimation and light.

The dyestuff mixture used above was prepared as follows: 17.2 parts of 2-chloro-4-nitraniline were pasted with 20 parts of water and a solution of 7.0 parts of sodium nitrite in 25 parts of water and 150 parts of ice were added. 25 parts of concentrated hydrochloric acid were then stirred in. The resulting diazo solution was stirred for 10 minutes and then poured into a solution of 14 parts of bis-(cyanoethyl)-aniline and 6.4 parts of bis-(cyanoethyl)-meta-toluidine in 60 parts of concentrated hydrochloric acid and 40 parts of water. The mixture was stirred for ½ hour at 0 to 5° C. and then 300 parts of 4 N-sodium acetate solution were added. The red-brown dyestuff obtained in this manner was suctioned off.

The mixture of bis-cyanoethyl-aniline and bis-cyanoethyl-meta-toluidine used in the preceding paragraph was obtained by reacting a mixture of aniline and meta-toluidine in the ratio of 7:3 with acrylonitrile by the known method.

A similar result was obtained by using a mixture of the preformed individual dyestuffs in the aforementioned proportions in the first paragraph of this example instead of the paste.

*Example 2*

100 parts of polyethylene terephthalate fiber material was first cleaned for ½ hour in a bath containing 1 to 2 parts of the sodium salt of N-benzyl-μ-heptadecyl-benzimidazole disulfonic acid and 1 part of concentrated aqueous ammonia solution per 1000 parts of water. The material was then swelled for ½ hour at 80° C. in a dye-bath containing 15 parts of a mixture of approximately equal parts of ortho-hydroxydiphenyl, pine oil and Turkey red oil, and 15 parts of acetic acid in 300 parts of water; the bath was then allowed to cool to 50° C. and 10 parts of the dyestuff paste prepared as described in the first paragraph of Example 1 were added. In the course of 30 to 45 minutes the bath was raised to the boil and dyeing performed for 1 to 1½ hours as close as possible to the boiling temperature. The material was then thoroughly rinsed and, if necessary, washed for ½ hour at 60 to 80° C. with a solution containing 1 part of the sodium salt of N-benzyl-μ-heptadecyl-benzimidazole disulfonic acid per 1000 parts of water. The resulting strong orange-red dyeing displayed excellent fastness to sublimation and light.

*Example 3*

300 parts of polyester fabric were rolled up and put into a beam dyeing machine. 10,000 parts of an aqueous solution containing 10 parts of the sodium salt of N-benzyl-μ-heptadecyl-benzimidazole-disulfonic acid and 5 parts by volume of acetic acid of 80% strength were then allowed to circulate for 5 minutes at 50° C. 30 parts of the dyestuff dispersion of 10% strength obtained as described in the first paragraph of Example 1 were then added, and the dyebath heated to 132° C. in the course of 30 minutes and then circulated for 1 hour at that temperature. The dyebath was cooled to 90° C., the liquor run off and the fabric rinsed thoroughly with water. A strong, level orange-red dyeing of excellent fastness to light, rubbing and sublimation was obtained.

When the individual dyestuffs were used instead of the aforementioned dyestuff mixture, a dyeing was obtained which was not fast to rubbing because part of the dyestuff was deposited on the fabric owing to the poor stability of the dispersion.

What is claimed is:

1. A process for dyeing polyester fibers by the dispersion dyeing method, wherein a dyestuff mixture consisting of 65 to 75% of the dyestuff of the formula

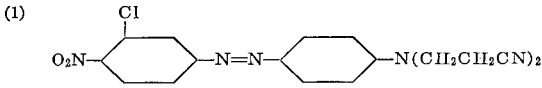

and 35 to 25% of the dyestuff of the formula

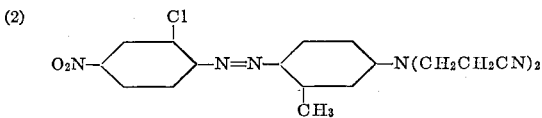

is used.

2. A process as claimed in claim 1, wherein the dyestuff mixture is used in a finely dispersed form in the presence of a dispersing agent.

3. A process as claimed in claim 1, wherein a swelling agent is added to the dyebath.

4. A process as claimed in claim 1, which is carried out under superatmospheric pressure at a temperature above 100° C.

5. Polyester fibers which have been dyed with a dyestuff mixture consisting of 65 to 75% of the dyestuff of the formula

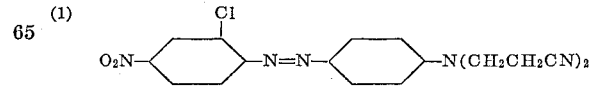

and 35 to 25% of the dyestuff of the formula

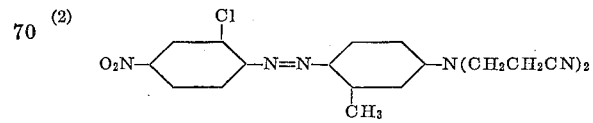

(References on following page)

References Cited by the Examiner

UNITED STATES PATENTS

| | | | |
|---|---|---|---|
| 2,506,020 | 5/1950 | Grossmann | 8—25 |
| 2,782,187 | 2/1957 | Sartori | 260—205 |
| 2,970,029 | 1/1961 | Kracker | 8—26 |
| 3,042,478 | 7/1962 | Merian | 8—55 |

FOREIGN PATENTS 604,720  10/1961  Belgium.

OTHER REFERENCES

Derwent: Belgium Report No. 82A, page A7, pub. Dec. 8, 1961.

Review of Textile Progress, 1960, page 311, pub. by The Textile Institute Society of Dyers and Colorists, Butterworths, England, 1962.

NORMAN G. TORCHIN, *Primary Examiner.*

ABRAHAM H. WINKELSTEIN, *Examiner.*

D. LEVY, *Assistant Examiner.*

UNITED STATES PATENT OFFICE
CERTIFICATE OF CORRECTION

Patent No. 3,264,052                                             August 2, 1966

Paul Rhyner

It is hereby certified that error appears in the above numbered patent requiring correction and that the said Letters Patent should read as corrected below.

Column 4, lines 42 to 44, the formula should appear as shown below instead of as in the patent:

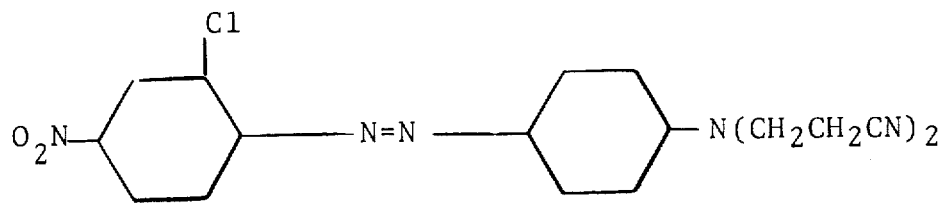

Signed and sealed this 5th day of September 1967.

(SEAL)
Attest:

ERNEST W. SWIDER                                     EDWARD J. BRENNER
Attesting Officer                                    Commissioner of Patents